United States Patent [19]

Dewald et al.

[11] Patent Number: 5,365,288
[45] Date of Patent: Nov. 15, 1994

[54] IMAGE MOVER

[75] Inventors: Duane S. Dewald, Dallas, Tex.; Lloyd G. Cross, Gualala, Calif.; Paul A. Linden, Overland Park, Kans.

[73] Assignee: Advanced Laser Projection, Inc., Dallas, Tex.

[21] Appl. No.: 212,365

[22] Filed: Mar. 14, 1994

Related U.S. Application Data

[63] Continuation of Ser. No. 955,310, Oct. 1, 1992, abandoned.

[51] Int. Cl.$^5$ .............................................. G03B 21/28
[52] U.S. Cl. ........................ 353/98; 359/216; 359/223; 348/203
[58] Field of Search ................. 353/98, 99, 46, 50, 353/51, 81, 122; 359/17, 197, 201–202, 205, 211, 212, 215, 216, 217, 220, 223, 225, 226; 348/195, 203, 759, 204, 205

[56] References Cited

U.S. PATENT DOCUMENTS

| | | | |
|---|---|---|---|
| 2,966,096 | 12/1960 | D'Incerti et al. | 88/16.8 |
| 3,326,077 | 6/1967 | Vandermeer | 359/226 |
| 3,427,634 | 2/1969 | Crabtree et al. | 359/223 |
| 3,549,800 | 12/1970 | Baker | 358/63 |
| 3,721,164 | 3/1973 | Kuttigen et al. | 359/223 |
| 3,894,798 | 7/1975 | Wolf | 353/122 |
| 4,078,860 | 3/1978 | Globus et al. | 352/69 |
| 4,235,535 | 11/1980 | Prinz et al. | 353/11 |
| 4,294,506 | 10/1981 | Hattori | 359/207 |
| 4,298,271 | 11/1981 | Sugiura et al. | 359/207 |
| 4,611,245 | 9/1986 | Trias | 358/235 |
| 4,613,201 | 9/1986 | Shortle et al. | 350/6.1 |
| 4,645,318 | 2/1987 | Trumbull | 352/69 |
| 4,681,414 | 7/1987 | Hershel | 353/102 |
| 4,818,098 | 4/1989 | Kahn et al. | 353/122 |
| 4,906,061 | 3/1990 | Yamaguchi | 350/63 |
| 4,969,734 | 11/1990 | Kahn et al. | 353/122 |
| 4,978,202 | 12/1990 | Yang | 350/331 R |
| 4,979,030 | 12/1990 | Murata | 358/63 |
| 4,980,565 | 12/1990 | Jehle | 250/334 |
| 4,982,092 | 1/1991 | Jehle | 250/332 |
| 5,051,834 | 9/1991 | Matui | 348/203 |
| 5,085,506 | 2/1992 | Kahn et al. | 353/122 |
| 5,130,838 | 7/1992 | Tanaka et al. | 359/200 |
| 5,136,426 | 8/1992 | Linden et al. | 359/583 |
| 5,140,427 | 8/1992 | Nakane et al. | 358/231 |
| 5,148,285 | 9/1992 | Nakane et al. | 358/63 |

*Primary Examiner*—William A. Cuchlinski, Jr.
*Assistant Examiner*—William C. Dowling
*Attorney, Agent, or Firm*—Pravel, Hewitt, Kimball & Krieger

[57] ABSTRACT

An image mover having a reduced sizing for the steering mirror and rotator assembly and associated components and motors is disclosed. The image mover comprises a relay lens to collimate and relay angular information of the light image from the projector scanning mirror. Rotators, such as K-mirror, pechan prism or dove prism, rotate the collimated image responsive to horizontal movement of the image. A restoring lens, which can either be a fixed focal length or a zoom lens, restores the collimated light image proportional to the angular information of the image produced by the projector. The restored diverging image is projected to a steering mirror and steered onto a viewing surface in real time.

32 Claims, 3 Drawing Sheets

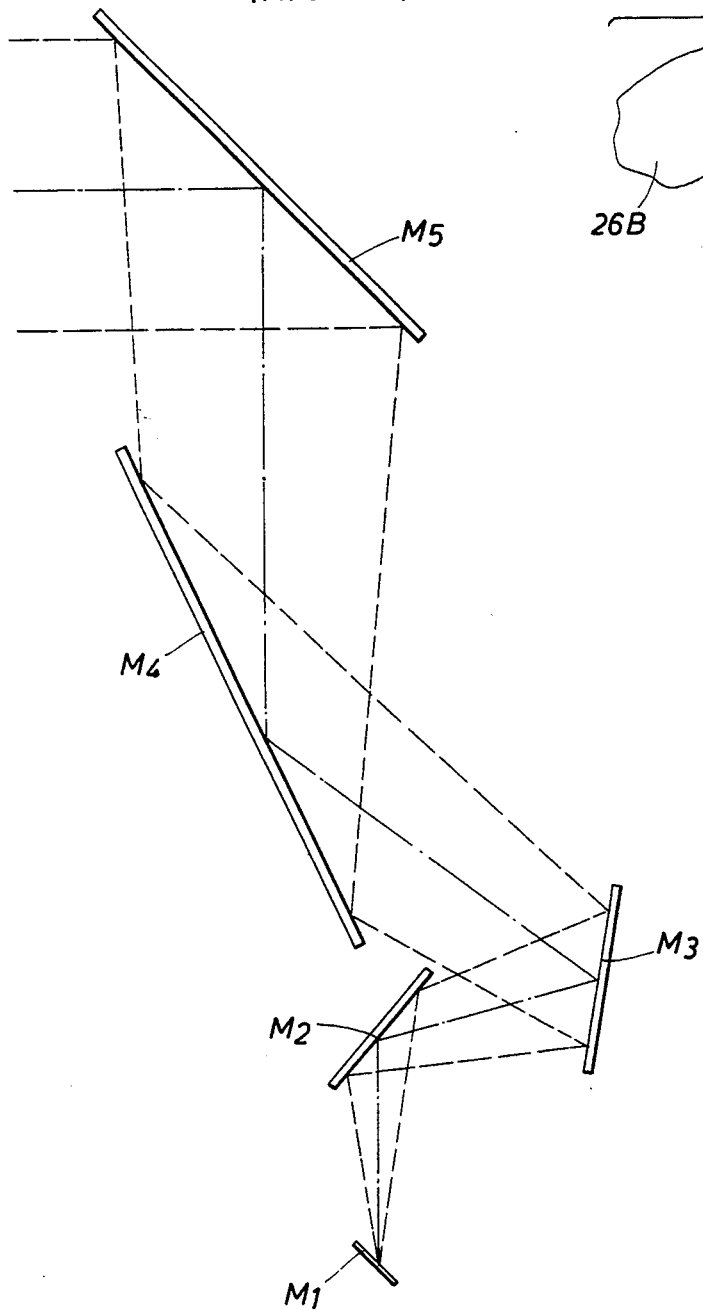
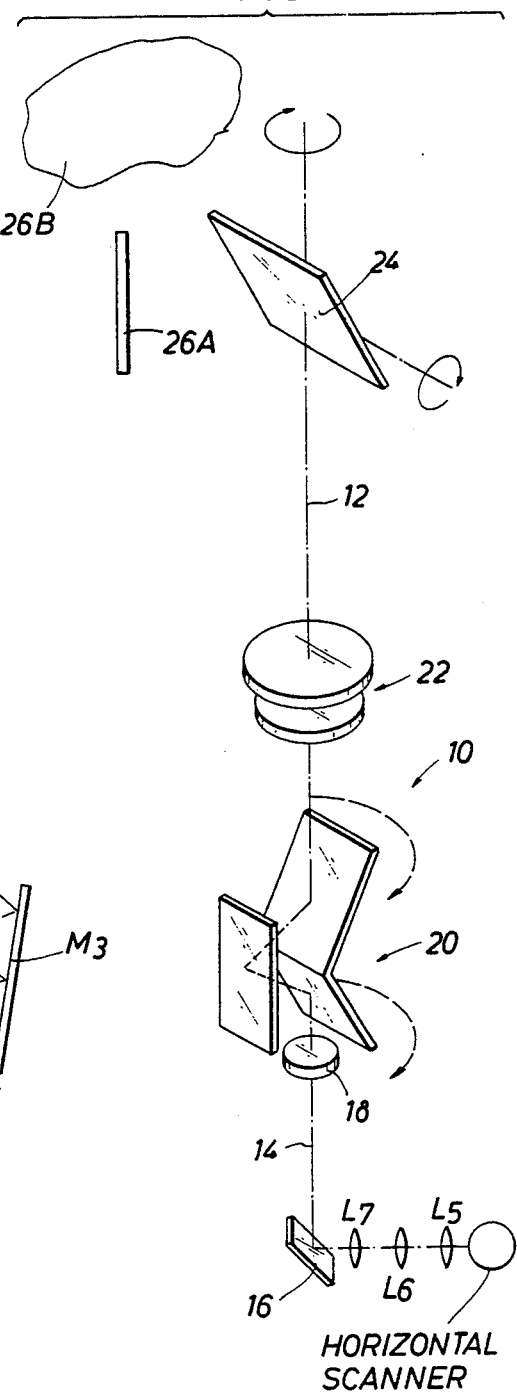
FIG. 1 (PRIOR ART)
FIG. 2

IMAGE MOVER

This is a continuation of application Ser. No. 07/955,310 filed Oct. 1, 1992 entitled "IMAGE MOVER" now abandoned.

FIELD OF THE INVENTION

This invention relates generally to a light projection apparatus and, in particular, but not exclusively, to an apparatus for use in the projection of television or video pictures and similarly derived images of computer generated or other visual information onto viewing surfaces. More particularly, this invention relates to an optical system attached to the final output of a projector for projecting images of varying size, contour and orientation relative to the projector on either single or multiple viewing surfaces.

BACKGROUND OF THE INVENTION

In conventional laser video projectors all of the red, green and blue light beam components are transmitted to a horizontal scanner or rotating polygon mirror having a predetermined number of facets and then onto three lenses, preferably 454–640 nm AR coated high power achromats to a frame scanner or scanning mirror. The three lenses positioned between the rotating polygon mirror and the scanning mirror are 55 mm, 25 mm cylindrical and 55 mm to 160 mm, respectively. Such a projector is disclosed in U.S. Pat. No. 5,136,426, which is assigned to the same assignee as the present invention and is incorporated by reference herein for all purposes. The image on the scanning mirror is then directed to a fixed steering mirror to a viewing surface. This viewing surface can be a solid surface, such as a conventional projector screen or wall. Other conventional scanning means could be used with the present invention, such as the scanning means disclosed in U.S. Pat. Nos. 4,613,201; 4,611,245; 4,979,030; or 4,978,202, that are incorporated by reference herein for all purposes.

It is known by those skilled in the art that when an image is moved horizontally by a rotating steering mirror, the image needs to be rotated responsive to this horizontal movement to maintain the image right side up. Conventional rotator means or assemblies to rotate the image responsive to the horizontal movement include a dove prism, K-mirror or pechan prism. However, because of the expanding nature of the image, or, in other words, the diverging image transmitted from the scanning mirror of the projector, a properly sized rotator assembly and the steering mirror are larger than desired and, in turn, require large motors for moving the steering mirror and rotator assembly.

Dove prisms have been used in the past for rotating the image responsive to the horizontal movement. U.S. Pat. Nos. 2,966,096; 3,894,798; 4,235,535; and 4,645,318 are examples of conventional dove prisms that are incorporated by reference herein for all purposes. Another example of a conventional dove prism used to rotate a laser image responsive to horizontal movement is a 2"×2"×6.5" dove prism having a prism corner cut of 55° with the index of refraction of the glass stock being n=1.51. This dove prism requires a 5"×5" steering mirror, weighs approximately 1150 grams (2.5 lbs.) and requires a rotation stage with a central aperture of at least 3".

U.S. Pat. No. 4,235,535 discloses a projector for projecting images onto a cylindrical screen for purposes of simulating the view of a ship in a ship simulator. The image is projected onto the dove prism 13 for rotation responsive to the horizontal movement of the image. The horizontal and vertical movement of the image are controlled by stepping motors. These stepping motors can be operated manually or by computer independently of each other. The speed of rotation of the dove prism 13 is one-half the horizontal movement.

Mirrors have also been used in the past for rotating an image. As best shown in FIG. 1 of U.S. Pat. No. 3,326,077, a lamp 52 is located below a photocell 54 directly behind a condensing lens system 56 which is designed to collimate the light emitted by the lamp onto a slightly inwardly tapered beam which illuminates the bottom slit pattern 50a. (col. 3, lns. 15–20) Also disclosed are mirrors 32, 36 and 60. (col. 4, lns. 7–11) U.S. Pat. No. 3,326,077 is incorporated by reference herein for all purposes.

FIG. 1 of the present invention illustrates a conventional K-mirror assembly. In this K-mirror the scanning mirror $M_1$ projects a diverging image onto a 1"×1" mirror $M_2$ which in turn reflects onto a 2"×2" mirror $M_3$ which in turn reflects onto a 4"×5" mirror $M_4$ to rotate the image. This K-mirror assembly then transmits the image to the steering mirror $M_5$ which is sized at 7"×6" to properly steer the complete image.

A conventional pechan prism to rotate an image is disclosed in U.S. Pat. No. 4,645,318. Conventional prisms, such as the dove and pechan prisms, are generally custom manufactured to specification by optic fabrication shops such as CVI of Albuquerque, N. Mex.; Rocky Mountain Instrument Co. of Longmont, Colo. and Kollmorgen Corporation of Northampton, Mass.

It has also been known in the past to use optics to collimate an image, as disclosed in U.S. Pat. Nos. 4,294,506 and 4,906,061. However, the collimated image has not then been projected through a rotator assembly, such as a K-mirror, pechan prism or dove prism, to rotate the image responsive to the horizontal movement of the steering mirror. Moreover, the angular information of the collimated image has not subsequently been restored after being transmitted through the rotator assembly so that the image continues to diverge.

U.S. Pat. No. 4,294,506 discloses an argon laser 36 where the image is passed through an expander lens 39, comprising a convex lens 39a and a concave lens 39b, to convert the image into a collimated image, as best shown in FIG. 4. After the light impinges on the facets 32a of a rotating polygon mirror 32, the collimated beam is reflected towards a scanning surface 34. An anamorphic optical system comprising a first convex cylindrical lens 37 and a condensor lens 33 is disposed intermediate the rotating polygon mirror 32 and scanning surface 34 to convert the collimated image to a converging image. (col. 3, lns. 22–40)

U.S. Pat. No. 4,906,061 discloses scanning a surface with a laser light beam. The light beam is projected through a collimator lens 2 to a rotating mirror 3, the light beam is deflected by the mirror 3 and applied through a fΘ lens 4 to converge on the surface to be scanned. The rotating mirror 3, as shown in FIG. 1, may comprise a rotating polygon mirror or a pyramidal mirror. The collimator lens 2, as best shown in FIGS. 2A and 2B, is movable along the optical axis to correct the curvature of the field.

An image mover for a light projector has been desired where the size of the steering mirror, rotator assembly and their associated parts and motors are reduced. This size reduction of the steering mirror and rotator assembly allows higher acceleration and velocity movement of the image with smaller motors.

SUMMARY OF THE INVENTION

According to the invention, an image mover adapted for use with a laser light image having angular information is provided. The image mover comprises a relay or first lens to collimate and relay angular information of the image from a projector scanning mirror. A rotator assembly such as a K-mirror, pechan prism or dove prism are used for rotating the collimated image responsive to the horizontal movement of the steering mirror. A restoring or second lens, which can either be a fixed focal length lens or a zoom lens, restores the collimated light image of a size proportional to the image angular information from the projector scanning mirror. The restored image is then projected to a steering mirror and steered onto a viewing surface in real time.

Additionally, the rotator assembly and the steering mirror may move independently or proportional to each other and are computer assisted for projection onto single or multiple viewing surfaces. Advantageously, a series of these relay lenses, restoring lenses and rotator assemblies can be used alone or with a fiber optic bundle for positioning the image on a viewing surface remote from the projector.

BRIEF DESCRIPTION OF THE DRAWINGS

The objects, advantages and features of the invention will become more apparent by reference to the drawings which are appended hereto wherein like numerals indicate like parts and wherein an illustrated embodiment of the invention is shown, of which:

FIG. 1 is a conventional K-mirror assembly and steering mirror with a diverging image;

FIG. 2 is a schematic of the rotator assembly disposed between the relay lens and the restoring lens which are, in turn, disposed between the scanning mirror and the steering mirror, respectively;

DETAILED DESCRIPTION OF PREFERRED EMBODIMENT

The image mover, generally indicated at 10, can be used with any light projector but is particularly adapted for use with a laser light projector, such as disclosed in U.S. Pat. No. 5,136,426. The image mover 10 of the present invention is preferably positioned above the projector so that the central axis 12 of the image mover 10 is aligned with optical axis 14 of the vertical scanning mirror 16. A laser light projector is particularly desirable for use with the present invention since the image will maintain focus at any desired distance from the projector, i.e. from the scanning mirror 16 to infinity.

Figure 3:
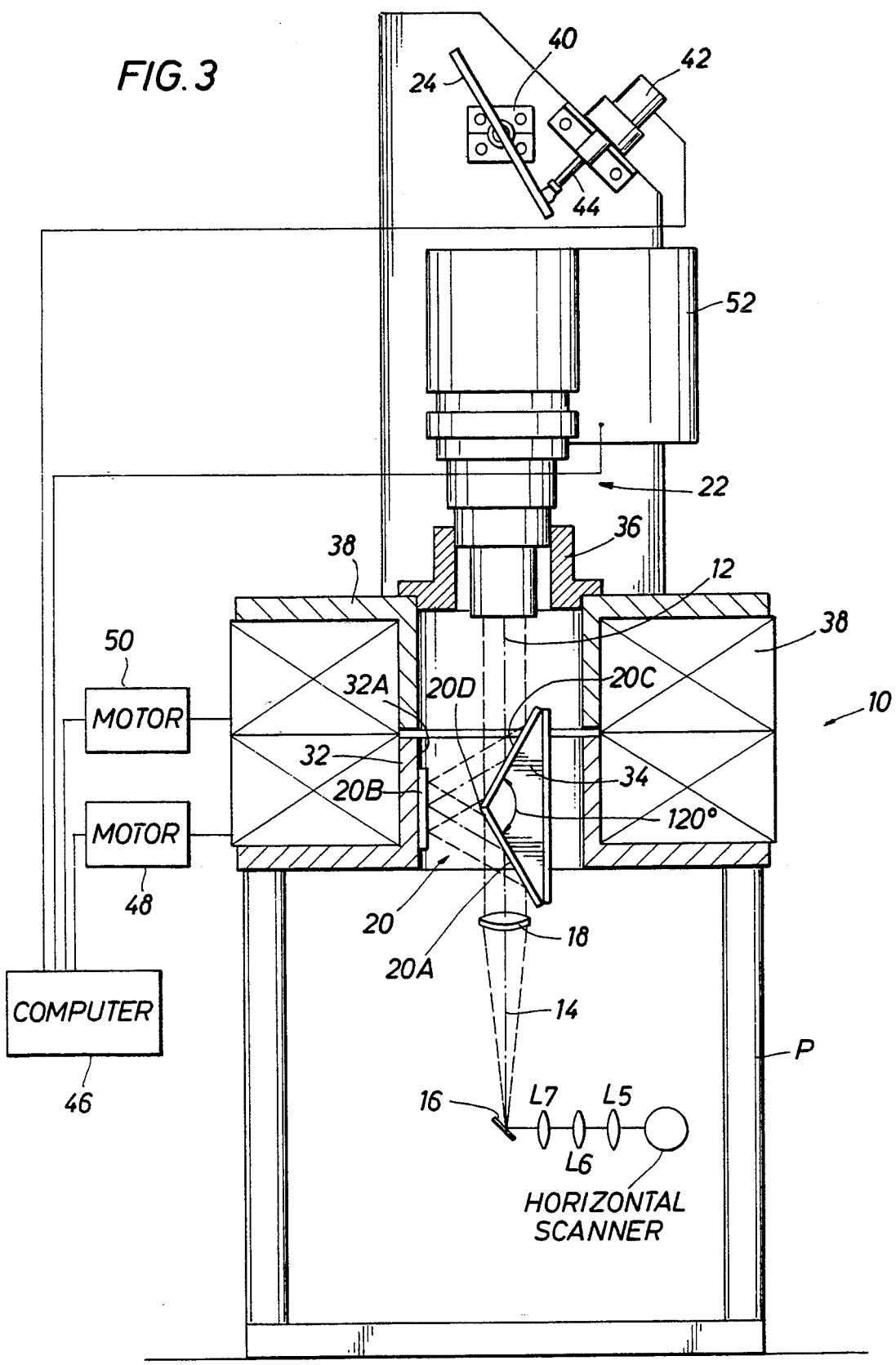
FIG. 3 is a sectional elevation view of the preferred embodiment of the present invention.
Figure 4:
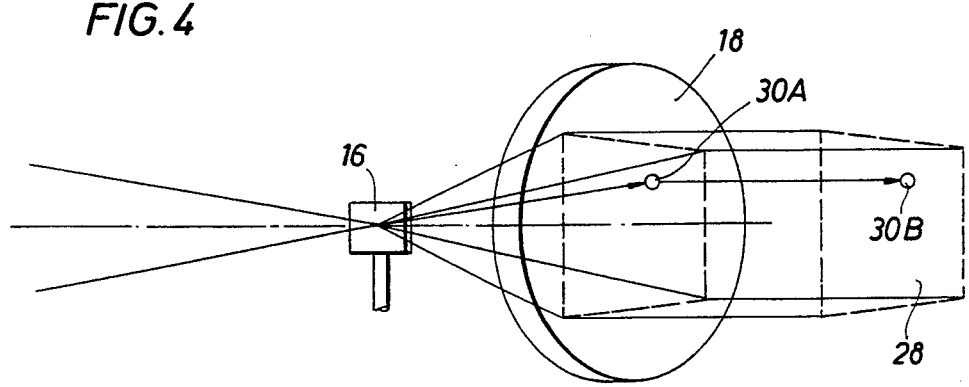
FIG. 4 is a perspective view of a scanning mirror, relay lens and intermediate image plane of the present invention.
Figure 5:
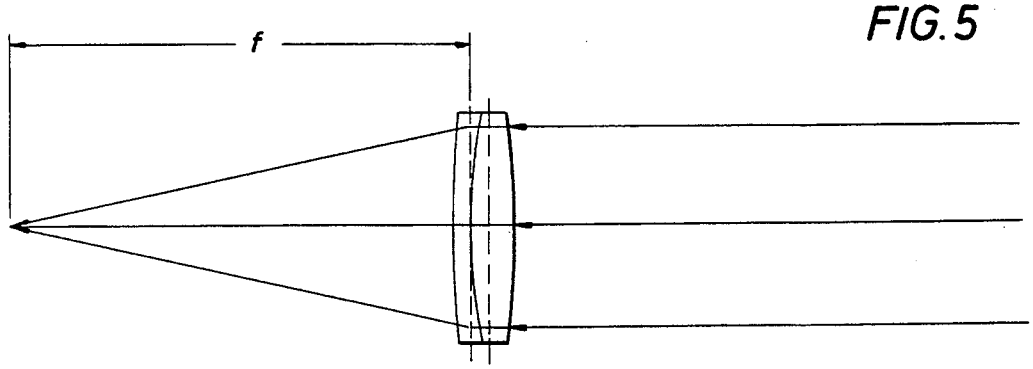
FIG. 5 is an elevational view of conventional imaging having an infinite conjugate.

The scanning mirror 16 is similar to the frame scanner $S_2$ as shown in FIGS. 1, 3 and 7 or reference number 104 in FIG. 4 of U.S. Pat. No. 5,136,426. As explained in col. 5, lns. 29-48 of U.S. Pat. No. 5,136,426 and as shown in FIGS. 2 and 3 of the invention, the projector P includes a 55 mm lens $L_5$, a 25 mm cylindrical lens $L_6$ whose power is in the vertical direction, but for use with the present invention the lens $L_7$ is preferably a 120-125 mm lens to provide the desired throw distance for the image mover, as will be discussed below in detail.

In general, an image is first projected off the vertical scanning mirror 16. The image is then passed through a first or relay lens 18. Preferably, the relay lens 18 is an achromat lens for collimating the angular information provided from the scanning mirror 16. By positioning the relay lens 18 of the present invention close to the scanning mirror 16, preferably one focal length of lens 18, the relay lens 18 intercepts the scanned images before they diverge into a large area requiring the large rotator assemblies and mirrors along with the motors to operate them. The collimated image is then passed through the rotator assembly, generally indicated at 20, such as a K-mirror assembly, as shown in FIGS. 2 and 3 or a dove prism or pechan prism, as discussed previously. The collimated image is then transmitted to the second or restoring lens, generally indicated at 22, to restore the diverging angular information of the image. This restored image is then transmitted to a steering mirror 24 for projection onto a viewing surface 26. The viewing surface 26 is defined as any solid surface 26A, such as a projector screen or wall, or could be a fluid surface 26B, such as smoke or any other gas or liquid.

As is known to those skilled in the art, laser projection differs from conventional projection in that all of the angular information of the projected image is present from the time the laser reflects off the scanning mirror 16. However, in conventional projection, be it film, slides, cathode ray tube, liquid crystal, liquid crystal light valve or oil film light valve projectors, the desired image is created on one plane and a set of optics, such as an objective lens, is used to relay this image to the viewing surface. In laser video projection, image planes are not used. Instead, the combined laser beams, which contain color and intensity information, are scanned horizontally by the horizontal scanner to produce a TV line and each line is positioned vertically by the vertical scanning mirror 16, such as disclosed in U.S. Pat. No. 5,136,426. Thus, a laser video picture is comprised of video information and angular information in two orthogonal directions. Only when this diverging set of laser beams intercepts a viewing surface is an image produced. Therefore, an image in the laser video projection industry is not an image in the conventional optical sense but image is defined herein as the information transmitted by the scanning mirror 16.

Figure 6:
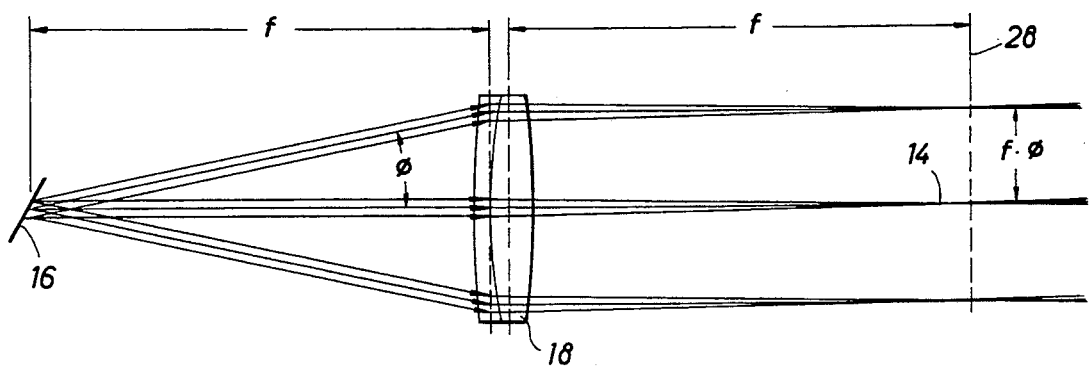
FIG. 6 is an elevational view of the angular information being transmitted from the scanning mirror to the relay lens of the present invention.

Turning to FIG. 6, at one focal length f away from the relay lens 18, an intermediate image plane 28 is formed. A beam waist is formed at a point displaced from the optical axis 14 by the product of the focal length $f_{18}$ of the relay lens 18 and the vector sum of the horizontal and vertical scan angles of the laser video image, as best shown in FIG. 6. Therefore, at plane 28, one focal length f down the optical axis 14, from relay lens 18 the scanned laser images are focused to the gaussian beam waist.

A matrix of the horizontally and vertically scanned image from the scanning mirror 16 will form a representation of the video image on plane 28. This representation will not show the detail of the image in all instances because the beam waist diameter may be greater than the width of one video line on plane 28. The restoring lens 22 is positioned so that its infinite conjugate focal point coincides with the plane 28. Then each point, for example point 30B in FIG. 4, in the plane 28 will correspond with one unique horizontal and vertical angle originally relayed from relay lens 18, such as pixel 30A of the laser video image. Therefore, each angle of the restoring lens 22 is proportional to the displacement of the point on plane 28 from the optical axis 14 and the focal length $f_{22}$ of the restoring lens 22. In this manner, the angular information that constructs the laser video image is captured by the relay lens 18, collimated and relayed to the resulting lens 22 whereby it is subjected to a reverse process to restore the horizontal and vertical scanning. The laser images are restored to their original angularly scanned state with the three color beams being collimated so as to preserve the infinite depth of field characteristic to laser video.

In other words, the relay lens 18 stores the angular information of the laser video image, such that it can be moved through the rotator assembly 20 and then to the restoring lens 22 to restore the scanned projected image. By positioning the restoring lens 22 such that its back focal plane coincides with the intermediate image plane 28, the scanned projected image is restored with the scanned angles being proportional to the ratio of the focal length of the relay lens ($f_{18}$) to the restoring lens ($f_{22}$), as will be discussed in more detail below.

As best illustrated in FIG. 6, the minimum aperture of the relay lens 18 would be the product of the largest full scan angle $\phi$ of the image from the scanning mirror 16 and the focal length f of the relay lens 18. In other words, if the relay lens 18 is placed one focal length $f_{18}$ from the scanning mirror 16, the relay lens 18 must have a clear aperture large enough to capture the entire fan of the laser images at that point. In the preferred embodiment, the relay lens 18 has a diameter of 31.5 mm.

Turning now to FIG. 3, the preferred embodiment of the image mover 10 is shown. The horizontal scanner of projector P or rotating polygon mirror transmits the light beams through lens $L_5$, $L_6$ and $L_7$, as discussed previously, to the vertical scanning mirror 16. The scanning mirror 16 of projector P is attached to a galvanometer or similar device as disclosed in U.S. Pat. No. 5,136,426 to scan the video picture or image vertically from the projector P to the relay lens 18. The relay lens 18 has the effect of relaying the angular information of the projected image while focusing the previously collimated laser beams to the beam waist exactly one focal length $F_{18}$ down the optical axis 14 from relay lens 18, as discussed above. The relay lens 18 is preferably a 31.50 mm diameter, 100 mm focal length achromat. This relay lens is available from either Melles Griot of Irvine, Calif. (Part No. $\phi$1LAO 126) or Newport of Irvine, Calif. (Part No. PACO73). The intermediate image plane 28 is rotated about the optical axis using an image rotator assembly, preferably a K-mirror assembly 20, shown in FIGS. 2 and 3. The K-mirror assembly 20 includes the two 1.4"×2.15" and one 0.75"×1.6" front surface enhanced aluminum mirrors mounted such that no displacement of the optical axis 14 occurs. The mirror assembly can be fabricated from 7.5"×7.5" mirror stock available from Newport in Irvine, Calif. (Part No. 75J00ER.3). Mirror 20B, preferably having a length of 1.6", is mounted directly on the innerbore surface 32A of a rotary table 32 and mirrors 20A, 20C, preferably each having a length of 2 15", are mounted on a precision machine block 34 at an angle of 120° relative to each other. The machine block 34 is also attached to the table 32 and has a length of 3.600". The apex 20D of mirrors 20A, 20C is preferably positioned 0.893" from mirror 20B with mirror 20B having a typical thickness of 0.118". The diameter of the bore of rotary table 32 is 3.00". As discussed previously, the rotation of the table 32 results in rotation or "flipping" of the image about the optical axis 14.

The restoring lens mount 36 is positioned on a rotary table 38. The tables 32, 36 are designed for 360° continuous rotation about the image mover central axis 12. The tables 32, 36 can be rotated independently of each other in response to signals generated by a computer 46 or proportional to each table 32, 36. Preferably, the restoring lens 22 is a motorized zoom lens driven by stepping motor 52 to allow remote movement of the zoom lens to change the projected image size. Thus, as the zoom lens focal length is adjusted, the projected image size will change but the image focus will not be affected. The zoom lens shown in the preferred embodiment is a 85–210 mm motorized zoom lens manufactured by Schneider Corporation of Woodbury, N.Y. After the image travels through the zoom lens, the image will diverge at a rate established by the zoom lens focal length to the steering mirror 24.

The angular information relay lens 18 can be selected such that conventional slide projector or video camera lenses can be used for the resulting lens 22. However, care must be taken to ensure that aberrations, field curvature and distortions are not introduced.

The steering mirror 24 preferably is held in a pivoting mount 40 and is moved by a linear stepping motor 42 attached for tilting the mirror 24 and, therefore, the projected image vertically. The steering mirror 24 of the preferred embodiment is 3.5"×4.0" and can be cut from the same mirror stock as the K-mirror assembly. Movement of the image vertically is caused by extending or retracting arm 44 of the stepping motor 42 attached to the steering mirror 24. Movement of the image horizontally is caused by rotation of the steering mirror 24 on the table 38. The use of stepping motors for moving the tables 32, 38, zoom lens 22 and steering mirror 24 is preferred because of their ability to provide repeatable motion, high-holding torque and positional stability. With micro-stepping, horizontal angle resolutions of 1/1000° or less is possible. In the preferred embodiment, a 150 oz.-inch stepping motor is used that is available from New England Affiliated Technologies of Lawrence, Mass. (Part No. 2198350). Alternatively, servo motors such as a brushless servo motor available from New England Affiliated Technologies (Part No. 2198369) could be used. If servo motors are used, a positional feedback means to drive the electronics, such as a digital absolute encoder, could be used. For best resolution (i.e., 1/20 of a degree) the encoder needs at least 16 bits, 65536 per revolution. Alternatively, a relative position encoder and a counter could be used. Stepping motors 48 and 50 are used to rotate tables 32 and 38, respectively, about the image mover axis 12, as will be discussed below in detail.

As discussed previously, the ratio of the focal lengths of the relay lens 18 ($f_{18}$) and the restoring lens 22 ($f_{22}$) determines the throw ratio of the projected image. For example, if the focal length of the 31.5 mm relay lens 18 is 100 mm and the restoring lens 22 has a focal length of 85 mm, a throw ratio of 4.8:1 is achieved (image width: distance to viewing surface). If the focal length of lens 22 is 210 mm, a 11.86:1 throw ratio is achieved.

If the focal length of relay lens 18 is 50 mm (half the focal length of the preferred embodiment), then the intermediate image plane 28 will be half as large, and the throw ratios will be doubled for the same focal length for restoring lens 22:

$f_{22}$=85 mm: throw ratio=9.6:1
$f_{22}$=210 mm: throw ratio=23.7:1

If the restoring lens 22 is selected so that it is sufficiently short in focal length, such as the use of a 22.8 mm lens instead of a 85–210 mm lens of the preferred embodiment, projection throw ratios as low as 1.1:1 can be obtained.

By increasing the focal length of the relay lens 18, the number of facets used in the rotating polygon mirror can be increased. The higher number of facets in the rotating polygon mirror reduces the scan angle $\phi$. By using the present invention image mover 10, this reduction in scan angle $\phi$ can be compensated for by a longer focal length relay lens 18 that would increase the size of the intermediate image plane 28 thereby increasing the angular size of the image after passing through the restoring lens 22. Therefore, high definition projection TV or other formats requiring high scan rates with short throw ratios can be produced without increasing the speed of the rotating polygon mirror. Since a higher horizontal scan rate is crucial to high definition TV, and since the polygon mirrors become difficult and expensive to manufacture at higher speeds, this is an economical way to reach HDTV video performance without sacrificing the ability to project large images from short distances. A similar compensation for reduced scan angle can be obtained by decreasing the focal length of lens $L_7$ of the laser video projector.

The image mover 10 is an afocal telescope (the combination of lenses 18 and 22 when focused correctly) that also functions as a beam expander. When a laser beam is expanded, its diameter is increased by the magnification of the telescope (which in turn is the ratio of the focal lengths of lenses 18 and 22, i.e. $f_{22}/f_{18}$), and its divergence is decreased by the same ratio. Thus, when long throw ratios are used, the beam leaving the machine has a smaller scan angle (so the picture is smaller), larger beam diameter, and smaller beam divergence. For some distance from the projector the beams will be large and the picture small, so the picture will not have much detail. At long distances, the beam will not have diverged as much as it would have at a shorter throw ratio, but the picture is small, also. As long as the laser beam diameter is smaller than the scan line, picture quality is sufficient.

For example, if $f_{18}$=100, and $f_{22}$=200, the magnification is 2.0. The picture would be half as large when it intercepts a projection surface as it would have been if no image mover was present. The beam diameters leaving lens 22 would be twice the diameter than if no image mover was present, and the divergence would be half. By halving the picture size and halving the beam divergence (which is important over long distances, rather than the beam diameter leaving the projector) image quality at long distance if maintained. However, a picture of sufficient quality may not be formed until several feet from the projector, since near the projector the beam diameter is larger than a video line and the picture looks blurry. Throw ratios over 7:1 in the past were difficult to achieve but with the present invention ratios of 23.7:1 using $f_{18}$=50 mm and $f_{22}$=210 mm have been achieved as discussed above. This also works in reverse to achieve a 1.1:1 throw ratio, as discussed above. The 1.1:1 throw ratio is obtained by using a relay lens 18 with a focal length of 100 mm and the restoring lens 22 having a focal length of 22.8 mm. A quality picture can be formed less than a foot away from the steering mirror 24 that remains a quality picture when projected on a viewing surface sixty (60) feet or more away from the projector P.

It is also contemplated that a series relay lens, rotator assembly and restoring lens, such as shown in FIG. 2, could be used to position the projector, such as shown in U.S. Pat. No. 5,136,426, remote from a viewing surface. For example, a projector could be positioned in one room of a building and an image relayed upwardly through a hole in the floor of a room above onto a viewing surface in the room above the projector.

Also, it is contemplated that the intermediate image plane 28 could be projected onto a fiber-optic bundle with the other end of the bundle serving as input into the resulting lens 22. This would allow for greater flexibility in positioning the image but with a possible loss of brightness or resolution. An example of a fiber-optic bundle is a manufactured by Galileo Electro Optics of Starbridge, Mass.

IMAGE DE-ROTATION

When using rotator assembly 20 with a steering mirror 24, the rotation of the assembly 20 and mirror 24 have usually been linked together in the past so that the displacement, velocity, and acceleration of the rotator assembly 20 is exactly half that of the steering mirror 24, when panned left or right by rotary table 38.

When stepper motors, such as motors 42, 48, 50 and 52 are used without a mechanical link between them, it is necessary to account for the nonzero initial velocity found in the speed profile of a move. When the stepper motor controller performs a move, it instantly sets the motor in motion at an initial velocity Vi, followed by an acceleration up to the final velocity Vf, at an acceleration A. When the destination is being approached, the motor performs a deceleration of −A, again reaching Vi, upon which the motor stops. The customary unit of measure for velocity and acceleration is steps/sec and steps/sec/sec, respectively.

It is desirable to adjust the acceleration of the rotator assembly 20 such that at the moment when the steering mirror 24 stops accelerating and begins constant velocity motion, the rotator assembly 20 has moved through an angle exactly half that of the steering mirror 24. Thus, both begin constant velocity motion at the same time with their respective rotations coordinated such that image rotation is eliminated during the move.

The steering mirror 24 has an initial velocity $Vi_1$, a final velocity $Vf_1$, and an acceleration $A_1$. The rotator assembly 20 has an initial velocity $Vi_2$, final velocity $Vf_2=(Vf_1)/2$, and will be solved for acceleration $A_2$.

The acceleration time t, for the steering mirror 24 is $$t=(Vf_1-Vi_1)/A^1.$$

The distance traveled at the end of acceleration for the steering mirror 24 is given by:

$$x=Vi_1(t)+(\tfrac{1}{2})(A_1)t^2$$

The distance the rotator assembly 20 must travel in time t is half the value of x, above, therefore:

$$x/2 = Vi_2(t) + (\tfrac{1}{2})(A_2)t^2$$

solving for $A_2$ $$A_2 = \frac{(x - 2Vi_2(t))}{t^2}$$

EXAMPLE

The tables 32 and 38, shown in FIG. 3, are to be moved such that no image rotation is visible.
Table 38 initial speed: 400 steps/sec
Table 38 final speed: 10000 steps/sec
Table 38 acceleration: 10000 steps/sec/sec
Table 32 initial speed: 400 steps/sec
t = (10000−400)/10000 = 0.96 seconds
x = 400(0.96) + ($\tfrac{1}{2}$)(10000)(0.96)² = 4992 steps at end of acceleration (distance traveled by table 38)
therefore solving for acceleration of rotator assembly 20 on table 32:

$$A_2 = \frac{(4992 - 2(400)(.96))}{.96^2}$$

$$A_2 = 4583.3 \text{ steps/sec/sec}$$

With the table 38 acceleration being 10,000 steps/sec/sec and the table 32 acceleration being 4583.3 steps/sec/sec, the rotator assembly 20 has approximately one-half the acceleration of the steering mirror 24.

The computer 46 for running the preferred embodiment of this invention is an IBM compatible 80386SX from NEC of Boxborough, Mass. (distributor) though any computer with similar features could be used.

The foregoing disclosure and description of the invention are illustrative and explanatory thereof, and various changes in the size, shape and materials, as well as in the details of the illustrative construction may be made without departing from the spirit of the invention.

We claim:

1. Apparatus adapted for use with a projector having a diverging image and a steering mirror, comprising
    a first lens for collimating said diverging image to provide a collimated image,
    rotator for rotating said collimated image responsive to horizontal movement of the steering mirror, and
    a second lens for restoring said collimated image to a restored diverging image.

2. Apparatus of claim 1 wherein the projector further comprising a scanning mirror projecting a diverging laser light.

3. Apparatus of claim 1 wherein said first lens is an achromat lens.

4. Apparatus of claim 1 wherein said rotator is a K-mirror.

5. Apparatus of claim 1 wherein said rotator is a pechan prism.

6. Apparatus of claim 1 wherein said rotator is a dove prism.

7. Apparatus of claim 1 wherein said second lens having a fixed focal length.

8. Apparatus of claim 1 wherein said second lens being a zoom lens to change the size of said restored diverging image, said zoom lens being moved independently from said rotator.

9. Apparatus of claim 1 wherein the steering mirror projecting said restored diverging image to a viewing surface in real time.

10. Apparatus of claim 9 wherein the steering mirror moving independently from said rotator.

11. Apparatus of claim 9 wherein the steering mirror moving proportional to said rotator.

12. Apparatus of claim 1 wherein the focal length of the first lens is greater than 99 mm or the focal length of the second lens is less than 85 mm to provide a throw ratio of less than 4.8:1.

13. Apparatus of claim 2 further comprising the projector having a rotating polygon mirror having a predetermined number of facets and rotated at a predetermined velocity and a projector lens disposed between the rotating polygon mirror and the scanning mirror wherein when the number of facets are increased in said rotating polygon mirror, the focal length of the projector lens can be reduced or the focal length of the first lens can be increased to provide high scan rates and short throw ratios while maintaining the predetermined velocity of said polygon mirror.

14. Apparatus of claim 1 wherein the focal length of said first lens is less than 100 mm or the focal length of said second lens is greater than 200 mm to provide a throw ratio greater than 12:1.

15. Apparatus of claim 1 further comprising
    a third lens for collimating said restored diverging image from said second lens, and
    a fourth lens for restoring said collimated restored image to a resulting diverging image.

16. Apparatus adapted for use with a projector having a steering mirror and producing an image having angular information, comprising
    relay lens for collimating and relaying angular information of the image,
    rotator for rotating said collimated image responsive to movement of the steering mirror, and
    restoring lens for restoring said collimated image proportional to the angular information of said image produced by the projector.

17. Apparatus of claim 16 wherein the image maintains its focus to infinity and further comprising said relay lens having an intermediate image plane and wherein the projector further comprising a scanning mirror projecting a diverging laser light, wherein said relay lens producing an intermediate image plane being substantially equal to the distance between said relay lens and said scanning mirror.

18. Apparatus of claim 17 further comprising horizontal and vertical scan angles of the laser light image projected from said scanning mirror wherein the scan angle of the restored image being proportional to the ratio of the focal lengths of the relay lens and the restoring lens.

19. Apparatus of claim 17 further comprising said restoring lens having an infinite conjugate image plane wherein said restoring lens being positioned so that said restoring lens infinite conjugate image plane coincides with said intermediate image plane.

20. Apparatus of claim 17 further comprising a fiber-optic bundle positioned between said intermediate image plane and said restoring lens.

21. Apparatus adapted for use with a projector having a steering mirror and having a scanning mirror projecting a diverging image, comprising a first lens means for collimating the diverging image to produce a collimated image, a second lens means for restoring said collimated image to a restored diverging image, and rotator means disposed between said first and second lens means for rotating said collimated image in response to horizontal movement of the steering mirror.

22. Apparatus adapted for use with a projector having a scanning mirror projecting a diverging image, wherein the image maintains its focus to infinity, comprising a first lens means for collimating the diverging image to provide a collimated image, a steering mirror for projecting the image, rotator means for rotating said collimated image in response to horizontal movement of said steering mirror whereby said steering mirror is reduced in size by collimating the diverging image.

23. Apparatus of claim 22 a further comprising said steering mirror projecting the image to a viewing surface in real time.

24. Apparatus of claim 22 wherein said steering mirror moves independently from said rotator means.

25. Apparatus of claim 22 wherein said steering mirror moves proportional to said rotator means.

26. Apparatus of claim 22 further comprising stepper motor for moving said rotator means.

27. Apparatus of claim 22 further comprising stepper motor means for moving said rotator means and the steering mirror.

28. Apparatus of claim 27 further comprising a computer for controlling the movement of said stepper motor means.

29. Apparatus adapted for use with a projector having a scanning mirror and a rotating polygon mirror and a projector lens disposed between said mirrors, the rotating polygon mirror having a predetermined number of facets rotatable at a predetermined velocity, the projector producing a diverging image, wherein the improvement comprises:

a first lens for collimating the diverging image to provide a collimated image wherein when the number of facets of the polygon mirror are increased over the predetermined number of facets, the focal length of the projector lens can be reduced or the focal length of first lens can be increased to provide high scan rates and short throw ratios while maintaining the predetermined velocity of the polygon mirror.

30. Apparatus of claim 29 wherein the increased focal length of said first lens is 200 mm.

31. Apparatus of claim 29 wherein the increased number of facets of the rotating polygon mirror is twice the number of the predetermined facets.

32. Apparatus of claim 29 wherein the reduced focal length of the projector lens is 60 mm.

* * * * *